May 11, 1937.  T. B. PRICKETT ET AL  2,079,630
CHARGING OF CASES WITH CONTACT MATERIAL
Filed Sept. 12, 1934  2 Sheets-Sheet 1

Inventors:
Thomas B. Prickett
and Raymond C. Lassiat,
By Ira L. Nickerson
Attorney May 11, 1937.   T. B. PRICKETT ET AL   2,079,630
CHARGING OF CASES WITH CONTACT MATERIAL
Filed Sept. 12, 1934   2 Sheets-Sheet 2

Inventors:
Thomas B. Prickett
and Raymond C. Lassiat,
By Ira L. Nickerson
Attorney.

Patented May 11, 1937

2,079,630

UNITED STATES PATENT OFFICE 2,079,630

CHARGING OF CASES WITH CONTACT MATERIAL

Thomas B. Prickett and Raymond C. Lassiat, Woodbury, N. J., assignors to Houdry Process Corporation, Dover, Del., a corporation of Delaware Application September 12, 1934, Serial No. 743,692

12 Claims. (Cl. 23—288)

This invention relates to contact apparatus, especially of the type for subjecting fluids, either in liquid or in gaseous state, to the action of solid contact masses which may be mere inert spreading material, may possess selective adsorptive or catalytic activity, or may chemically combine with certain constituents of the fluids contacted thereby.

If the reactions are strongly endothermic or exothermic, or if the fluids which react or control the temperature of the reaction are in heat exchange relation with the mass while at a temperature considerably above or below the reaction temperature, extended research and experiments have determined that the control of the temperature of reaction (always a troublesome matter when the reaction involves heat transfer) is much more difficult when the solid contact material does not completely fill the reaction chamber. In an ordinary converter complete filling of the reaction chamber is a simple matter. The situation is different, however, in the case of converters having one or more auxiliary chambers and with perforated conduits (either plain or finned) extending from one or both of such chambers into the contact mass in the reaction chamber, as shown, for example, in certain copending applications, including Serial Nos. 611,362 and 611,363, filed by Mr. Eugene J. Houdry on May 14, 1932, now Patents Nos. 2,042,468 (issued June 2, 1936), and 1,987,904 (issued January 15, 1935), respectively.

One object of the invention is to devise ways and means for feeding solid contact material into the reaction chamber of a converter so as to take care of settling and shrinkage and to completely fill the reaction chamber. Another object is to provide filling means for converters of special design. Still another object is to guide in an effective manner the filling operation from the exterior of the converter. Still other objects will be apparent from the detailed description which follows.

The invention has special application to converters having at least one additional chamber adjacent the reaction chamber which may serve as a fluid chamber or manifold for the series of perforated conduits embedded in the contact mass for distributing fluid therein or removing fluid therefrom, or an additional chamber may serve to heat or cool a wall of the reaction chamber. When two such auxiliary chambers are provided, one may be used as a fluid inlet and the other as a fluid outlet, and there may be two series of perforated conduits, a series connected to each of the auxiliary chambers. With the conduits disposed in parallel with one another, the filling means for the contact mass must extend through one of such auxiliary chambers but not connected thereto. If there is an additional intervening chamber for heat exchange the filling means will extend through it also. Packing of the solid contact material is preferably effected by a jet of fluid, such as an air jet. Suitable guides are provided so that the jet may be directed accurately to pack the contact material between and around the perforated conduits and to fill the reaction chamber to its full capacity.

In order to illustrate the invention, concrete embodiments thereof are shown in the accompanying drawings, in which.

Figure 1:
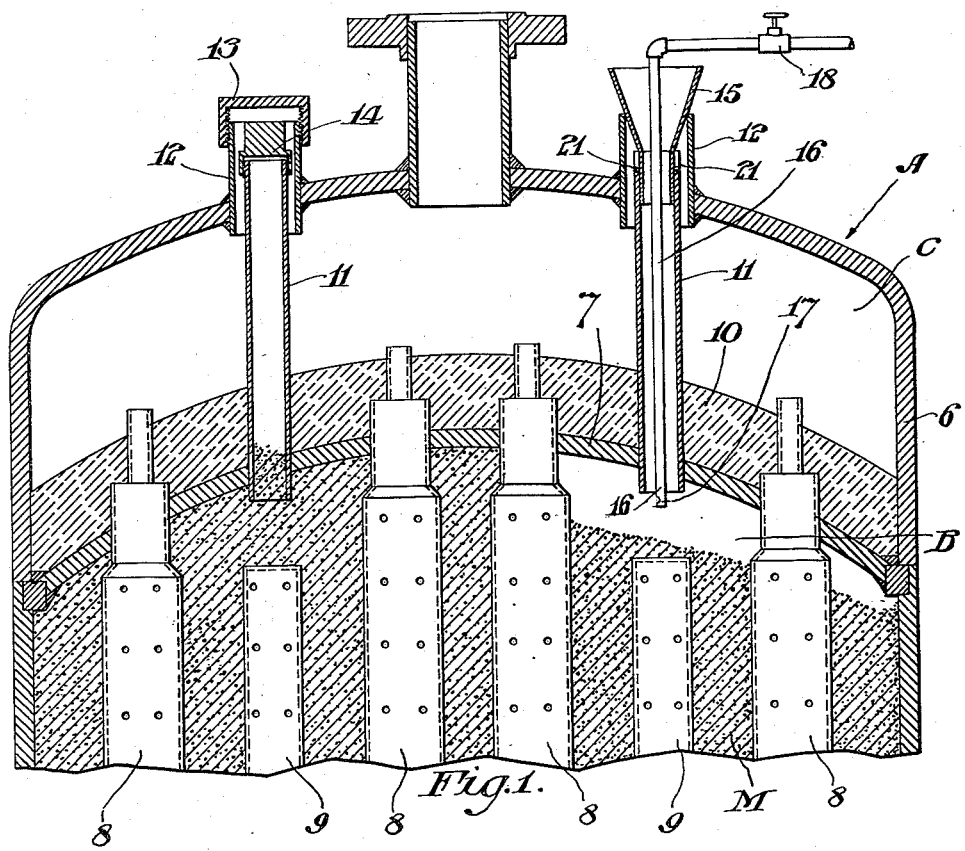
Fig. 1 is a fragmentary vertical sectional view of the upper part of a converter and illustrates the process of filling the reaction chamber with contact material.

Fig. 1 discloses a converter A having an outer wall 6 and providing therewithin a reaction chamber B and a fluid or manifold chamber C, these chambers being separated by a partition 7. A series of conduits 8 are mounted on partition or tube sheet 7 and extend into reaction chamber B to be embedded in the mass M of contact material by which chamber B is filled. Conduits 8 open into fluid chamber C and are provided with perforations or apertures in the parts which extend into chamber B, thereby establishing communication between the two chambers. Hence, conduits 8 may serve to distribute reactant, purging or regulating fluids from chamber C all through mass M or they may be used to remove fluid products from all parts of reaction chamber B. When the converter is producing simultaneous and uniform action throughout the contact mass by causing the reaction to take place at the same time and to the same extent in a multiplicity of localized areas after the manner disclosed in the aforesaid copending application Serial No. 611,362, a second series of perforated conduits 9 are provided. Conduits 9 may extend through wall 6 to be connected to an external header or manifold (not shown) or they may extend through an opposing partition or tube sheet similar to 7 to connect with a fluid or manifolding chamber similar to C. With such an arrangement one series of conduits may be used for the inlet and distribution of fluids while the other series is used for the outlet and removal of products. Means for applying and/or removing heat and for checking heat transfer may be used as desired. The exterior wall 6 will normally be lagged or covered with heat insulating material (not shown) and a layer of this material may be applied as at 10 to the upper side of partition 7 to control heat transfer between chambers B and C.

In order to fill the reaction chamber B with contact material, filler pipes 11 are provided, traversing chamber C and extending through insulating layer 10 and partition 7. The free ends of pipes 11 project upwardly toward or through suitable openings in outer shell 6, in which sleeves 12 are mounted above or enclosing such ends. Sleeves 12 and pipes 11 are sealed by caps or closures 13 and 14, respectively. The process of filling the reaction chamber comprises pouring the contact material into pipes 11 until the chamber is filled as far as possible by gravity. A jet device is then used forcibly to direct and pack additionally fed material around conduits 8 and 9 and up to and against the under side of partition 7. The form of jet device shown in Figs. 1 and 3 comprises a funnel 15 having a flared portion which extends above sleeve 12 and a constricted portion which telescopes within the free end of filler pipe 11 with a fluid conduit 16 depending therefrom and projecting somewhat beyond the lower end of pipe 11. A small port 17 in the lower end of conduit 16 discharges a jet of fluid, such as compressed air, laterally into the reaction chamber B and projects the material fed to funnel 15 in the direction toward which port 17 is pointed.

Figure 2:
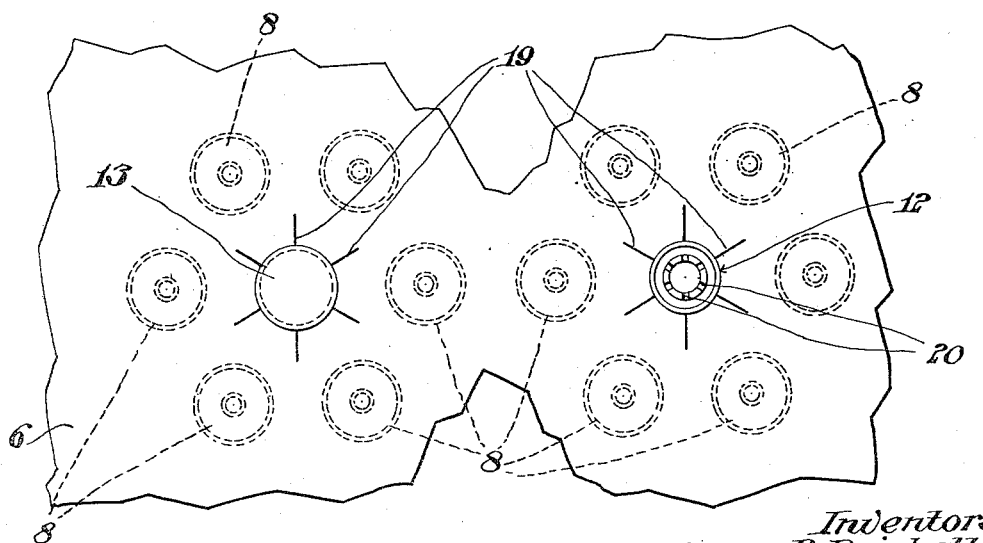
Fig. 2 is a plan view of a portion of the top of a converter with one filler pipe and opening sealed, while the adjacent one is open and illustrates two types of indicia for directing the jet.
Figure 3:
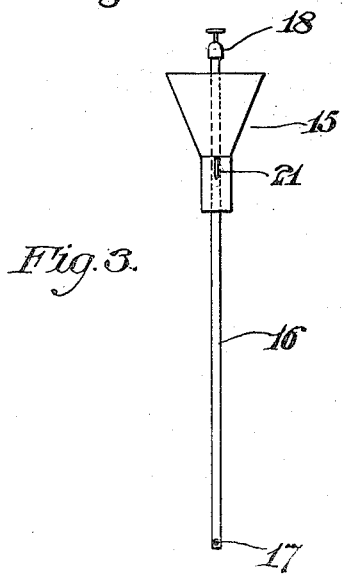
Fig. 3 is an elevational view of the fluid jet filling device shown in the filler pipe at the right side of Fig. 1, but after a quarter turn.

Since the pattern or arrangement of conduits within reaction chamber B is not visible from the outside of converter A, suitable indicia are provided for directing the fluid jet so that all spaces around the conduits will be filled. Fig. 2 shows marks 19 applied to outer wall 6 (or upon insulating material thereon) pointing between conduits 8 (shown in dotted outline). Fig. 2 indicates a hexagonal pattern of conduits, but other patterns such as square, triangular, etc. may be used as desired. Filler pipes 11 are shown in Figs. 1 and 2 as mounted directly above conduits 9, but any other location within the pattern unit for conduits 8 may be selected. Marks such as 19 are a convenient arrangement when the feeding device has jet discharge port 17 in line with the supply pipe carrying control valve 18, since the operator merely locates the supply pipe above marks 19 in succession while feeding the contact material into funnel 14. Another way to direct the jet is to provide notches 20 in the top of filler pipe 11 (see right side of Fig. 2) and one or more cooperating projections 21 on the funnel portion 15 of the filler device (Figs. 1 and 3).

Figure 4:
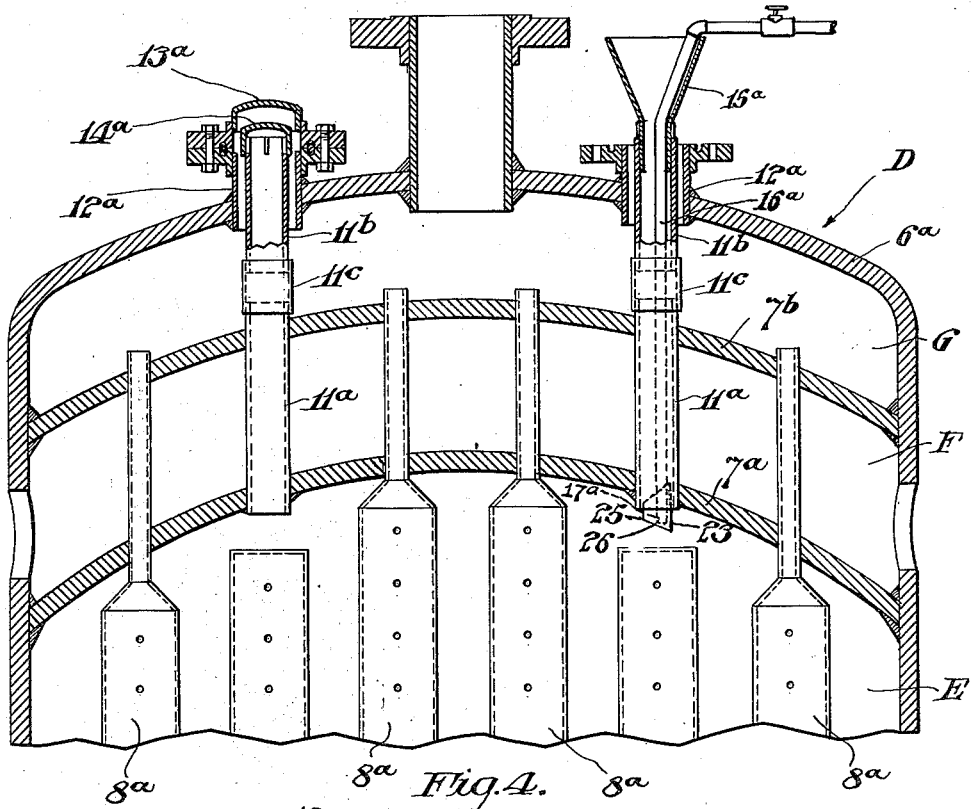
Fig. 4 is a fragmentary vertical sectional view similar to Fig. 1 of the upper part of a modified converter showing a modified form of fluid jet filling device.

Fig. 4 shows a converter D providing a reaction chamber E and two fluid chambers F and G thereabove formed by partitions 7a and 7b. Chamber G may serve as a manifolding chamber for a series of perforated conduits 8a. Chamber F may be used for the passage of a heating or cooling medium, as desired or required by the reaction taking place in chamber E. Insulating material (not shown) may be applied to partition 7b and to the portions of conduits 8a which pass through chamber F. The catalyst filling pipes are in two parts 11a and 11b, joined by a union 11c. As in Fig. 1, there are enclosing sleeves 12a mounted in openings in the outer wall 6a of converter D, the sleeves being flanged in this instance to accommodate flanged caps or closures 13a above the caps 14a on filler pipe extensions 11b.

Figure 5:
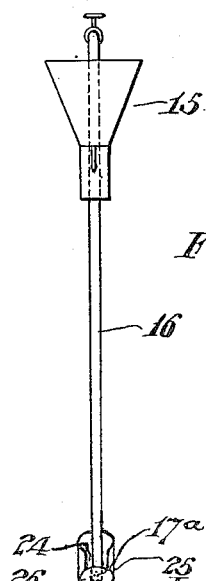
Fig. 5 is an elevational view similar to Fig. 3 of the fluid jet filling device shown in Fig. 4.

The filler device shown in Figs. 4 and 5 is similar to that shown in Figs. 1 and 3, but the fluid conduit 16a instead of being centrally located is at one side of funnel 15a to dispose jet opening 17a at the rear of a deflector 23 mounted on the end of conduit 16a and of a size to pass through the filler pipe so as to be disposed somewhat below the open end of the latter. Deflector 23 has a restricted opening 24 in its side wall 25 disposed opposite jet opening 17a and an upwardly slanting bottom 26 so that contact material fed into funnel 15a is discharged laterally and in a somewhat upward direction from deflector 23.

Fig. 1 illustrates very clearly the operation of filling the reaction chamber with the catalyst or other contact mass M, or of refilling the chamber when necessary due to settling and/or shrinkage. The left side of Fig. 1 shows the chamber entirely filled and an extra amount of contact material left in filler pipe 11 to take care, so far as possible, of settling and shrinkage. The jet filling device is in place in filler pipe 11 at the right side of Fig. 1, forcibly to direct the movement of the contact material by the jet issuing from opening 17 in pipe 16 which is disposed below the lower end of pipe 11, the jet being directed in accordance with markings 19 or the notch and projection means 20, 21 until the chamber is solidly packed with the contact material. Reaction chamber E of Fig. 4 will be filled in a similar manner, the deflector 23 being particularly useful when the contact material is rather coarse and heavy. The forms of filling devices may be used interchangeably, as desired. The loose engagement of the free ends of filler pipes 11 or 11b in sleeves 12 or 12a is important since it permits relative movement in all directions when the apparatus or parts thereof are subjected to wide temperature variations.

While the invention has been herein disclosed in what are now considered to be preferred forms, it is to be understood that it covers all changes, modifications and adaptations within the scope of the appended claims.

We claim as our invention:

1. A converter providing a reaction chamber and a fluid manifolding chamber adjacent thereto, and bounded on one side by the outer wall of said converter, a partition separating said chambers, a plurality of perforated conduits extending within said reaction chamber in spaced relation and in substantial parallelism, ends of said conduits being mounted in said partition and providing fluid communication through said partition between said manifolding chamber and said reaction chamber, an opening in the aforesaid outer wall of said converter, a tubular sleeve mounted in said opening in said outer wall, the length of said sleeve being substantially greater than the thickness of said end wall, an imperforate conduit for use in filling said reaction chamber with contact material, said imperforate conduit being mounted in the aforesaid partition in registering relation with an opening therein, and extending through the said fluid manifolding chamber and extending loosely within the said sleeve to permit free axial expansion or contraction of said imperforate conduit with respect to said sleeve, the end of said conduit terminating within said sleeve, a closure for said sleeve, and a closure for said conduit within said sleeve and removable after removal of said first-named closure.

2. A converter providing a reaction chamber and a fluid chamber adjacent thereto, a partition separating said chambers but providing means to establish communication therebetween, a conduit mounted in said partition for filling said reaction chamber with contact material, the converter having an opening in its outer wall in line with said conduit, means insertable from the exterior of the converter through said conduit for projecting the contact material in any direction from the lower end of said conduit, and means for sealing said conduit against communication with said fluid chamber, and means for sealing said opening.

3. A converter providing a reaction chamber and a fluid chamber adjacent thereto, a partition separating said chambers but providing means to establish communication therebetween, a conduit mounted in said partition for filling said reaction chamber with contact material, said conduit extending through an opening in the outer wall of the converter, a sleeve on said wall enclosing said extending end of said conduit, fluid jet means insertable from the exterior of the converter through said sleeve and said conduit for directing the packing of the contact material during the filling operation, and closures for the extended end of said conduit and for said sleeve.

4. In combination, a converter providing a reaction chamber and a fluid chamber adjacent thereto, a partition separating said chambers, perforated conduits mounted on said partition and extending into said reaction chamber for establishing communication between said chambers, means including a pipe mounted in said partition for filling said reaction chamber with contact material, the converter having an opening in its outer wall in line with said pipe, a fluid jet member insertable through said opening and said pipe for propelling the contact material laterally within said reaction chamber, and indicia adjacent said opening related to the location of said conduits within the converter.

5. In combination, a converter providing a reaction chamber and a fluid chamber adjacent thereto, a partition separating said chambers, perforated conduits mounted on said partition and extending into said reaction chamber for establishing communication between said chambers, means including a pipe mounted in said partition for filling said reaction chamber with contact material, the converter having an opening in its outer wall in line with said pipe, a fluid jet member insertable through said opening and said pipe for propelling the contact material laterally within said reaction chamber, and cooperating engaging means on said member and on said pipe for locating the former so as to direct the fluid jet between adjacent perforated conduits, thereby completely to fill the reaction chamber with contact material.

6. In combination, a converter providing a reaction chamber and a fluid chamber adjacent thereto, a partition separating said chambers, perforated conduits mounted in said partition and extending into said reaction chamber for establishing communication between said chambers, means for filling said reaction chamber with contact material including pipes mounted on said partition but extending through said fluid chamber and through openings in the outer wall of said converter, and a filling member insertable through said openings and said pipes having a funnel portion with a depending jet or nozzle portion extending into said reaction chamber, and means for positioning said filling member so that said jet or nozzle will be directed between adjacent perforated conduits, thereby to insure a complete filling of the reaction chamber with contact material.

7. In combination, a converter providing a reaction chamber and a fluid chamber adjacent thereto, a partition separating said chambers, perforated conduits mounted in said partition and extending into said reaction chamber for establishing communication between said chambers, means for filling said reaction chamber with contact material including pipes mounted on said partition but extending through said fluid chamber and through openings in the outer wall of said converter, and a filling member insertable through said openings and said pipes having a funnel portion with a depending jet or nozzle portion extending into said reaction chamber, and means for positioning said filling member so that said jet or nozzle will be directed between adjacent perforated conduits comprising notches in the ends of said pipes and cooperating projections on the funnel portion of said filling member.

8. In combination, a converter providing a reaction chamber and a fluid chamber adjacent thereto, a partition separating said chambers, perforated conduits mounted in said partition and extending into said reaction chamber for establishing communication between said chambers, means for filling said reaction chamber with contact material including pipes mounted on said partition but extending through said fluid chamber and through openings in the outer wall of said converter, and a filling member insertable through said openings and said pipes having a funnel portion with a depending jet or nozzle portion extending into said reaction chamber, a deflector extending partly around and below said jet or nozzle portion to send the contact material laterally and upwardly, and means for positioning said filling member so that said jet or nozzle will be directed between adjacent perforated conduits, thereby to insure a complete filling of the reaction chamber with contact material.

9. Apparatus for use in combination in packing the reaction chamber of a converter with granular material comprising a filler pipe extending through a wall of the converter into the reaction chamber, a funnel adapted to be inserted into the outer end of said pipe, a conduit of relatively small diameter extending through said funnel and projecting therebeyond to terminate adjacent the end of the said filler pipe remote from the said funnel, said conduit having a lateral opening adjacent its end, a deflector in fixed position on the end of the said conduit remote from the said funnel to guide the jet from said opening, and indicating and positioning means associated with said converter and with said conduit for directing said jet.

10. A feeding device adapted for packing the reaction chamber of a converter with granular material, comprising a funnel member and a fluid conduit extending through said funnel member and secured to the latter, said conduit extending beyond the lower or restricted end of said member and having means for projecting laterally a jet of fluid, and stop and positioning means on the exterior of said funnel member.

11. A feeding device adapted for packing the reaction chamber of a converter with granular material, comprising a funnel member, a fluid conduit secured thereto, said conduit extending through and beyond said funnel member and having an opening adjacent its end in spaced relation to the lower or restricted end of said funnel member, and deflecting means on said conduit adjacent said opening to send a fluid jet substantially at right angles to said conduit.

12. A feeding device for use in packing with granular material the reaction chamber of a converter having a filling pipe comprising a funnel to fit the pipe, a conduit of relatively small diameter mounted upon said funnel to extend therethrough and project therebeyond, said conduit having a lateral opening adjacent its end in spaced relation to the lower or restricted end of said funnel, a deflector in fixed position on said end of said conduit to guide the jet from said opening, and stop and positioning means on the exterior of said funnel to cooperate with corresponding positioning means on the filling pipe of the converter to positon the jet.

THOMAS B. PRICKETT.
RAYMOND C. LASSIAT.